United States Patent
Brown et al.

(10) Patent No.: US 7,822,635 B1
(45) Date of Patent: Oct. 26, 2010

(54) MANAGING CONSUMER PREFERENCES WITH A PORTABLE DATA PROCESSING SYSTEM

(75) Inventors: Michael Wayne Brown, Georgetown, TX (US); Kelvin Roderick Lawrence, Round Rock, TX (US); Michael A. Paolini, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1041 days.

(21) Appl. No.: 09/560,392

(22) Filed: Apr. 28, 2000

(51) Int. Cl.
G06Q 30/00 (2006.01)
G07G 1/14 (2006.01)

(52) U.S. Cl. .................. 705/14.1; 705/14.4

(58) Field of Classification Search .............. 705/26, 705/14.1, 14.4
See application file for complete search history.

(56) References Cited

U.S. PATENT DOCUMENTS

| | | | |
|---|---|---|---|
| 5,510,828 A | 4/1996 | Lutterbach et al. | |
| 5,576,951 A * | 11/1996 | Lockwood | 705/27 |
| 5,710,884 A | 1/1998 | Dedrick | |
| 5,794,210 A * | 8/1998 | Goldhaber et al. | 705/14 |
| 5,848,396 A * | 12/1998 | Gerace | 705/10 |
| 5,890,149 A | 3/1999 | Schmonsees | |
| 5,961,593 A | 10/1999 | Gabber et al. | |
| 6,013,007 A | 1/2000 | Root et al. | |
| 6,014,634 A | 1/2000 | Scroggie et al. | |
| 6,055,513 A * | 4/2000 | Katz et al. | 705/26 |
| 6,055,573 A * | 4/2000 | Gardenswartz et al. | 709/224 |
| 6,128,663 A | 10/2000 | Thomas | |
| 6,385,651 B2 * | 5/2002 | Dancs et al. | 709/227 |
| 6,823,327 B1 * | 11/2004 | Klug et al. | 707/1 |
| 6,915,271 B1 * | 7/2005 | Meyer et al. | 705/14 |
| 2002/0023123 A1 * | 2/2002 | Madison | 709/203 |
| 2002/0120629 A1 * | 8/2002 | Leonard | 707/100 |
| 2003/0036949 A1 * | 2/2003 | Kaddeche et al. | 705/14 |
| 2004/0102197 A1 * | 5/2004 | Dietz | 455/456.1 |

FOREIGN PATENT DOCUMENTS

CA 2287094 A1 * 4/2000
KR 2001002032 A * 1/2001

OTHER PUBLICATIONS eCommerce, Dec. 1, 1999 "Shopper's Eye: A Very Personal Shopper".

* cited by examiner

*Primary Examiner*—Arthur Duran
(74) *Attorney, Agent, or Firm*—Dillon & Yudell LLP (57) ABSTRACT

In accordance with the method, system, and program of the present invention, consumer preferences designated for a user are transmitted in a transmittable data format from a portable data processing system associated with the user to multiple independent server systems each associated with a consumer provider from among multiple diverse consumer providers. Specialized services and products from each of the diverse consumer providers are designated for the user at each of the independent server systems, in response to comparing the consumer preferences for the user with a database of services and products at each of the independent server systems. The designated specialized services and products are transmitted to the portable data processing system in the transmittable data format, such that a consumer provider from among multiple diverse consumer providers adjusts offerings of services and products provided to a particular user via a portable data processing system according to electronically received consumer preferences for the particular user.

13 Claims, 6 Drawing Sheets

MANAGING CONSUMER PREFERENCES WITH A PORTABLE DATA PROCESSING SYSTEM

CROSS-REFERENCE TO RELATED APPLICATIONS

The present application is related to the following copending applications, which are filed on even date herewith and incorporated herein by reference:
(1) U.S. patent application Ser. No. 09/560,395; and
(2) U.S. patent application Ser. No. 09/560,629.

BACKGROUND OF THE INVENTION

1. Technical Field

The present invention relates in general to an electronic consumer preference manager and, in particular, to a method, system, and program for electronically managing consumer preferences for a user. Still more particularly, the present invention relates to a method, system and program for utilizing a single portable data processing system to manage transmission of consumer preferences for a user to multiple diverse retailer systems.

2. Description of the Related Art

As the tide is turning towards a paperless world, computers are becoming more prevalent in order to replace many functions previously performed utilizing paper. In particular, computing devices, such as personal digital assistants, laptop computers and cellular/digital telephones are becoming more commonplace as a personal, portable computer system. Such devices are typically designed to provide reliable and efficient transmittal and storage of data. For example, many digital telephones not only include capabilities to transmit and receive voice data, but to transmit and receive electronic data such as stock quotes, current weather and news. A small display device is typically provided to display the electronic data.

In the consumer world, web sites accessible via a personal computer are allowing services provided to consumers to become more customized. For example, a travel-related web site may provide for a user to enter travel preferences such that when fares that meet the travel preferences are available, the user is notified by electronic mail. In another example, a user may customize an opening web page, such as at yahoo.com, to include preferred types of news, stocks and weather when the user accesses the web page. However, while these web sites provide for user-customization, the user must typically re-enter preferences and personal information at each web site. For example, a user who registers at amazon.com must re-enter preferences and personal information to register at jcrew.com.

In addition, web sites which are accessible via a personal computer are providing bot services. A bot (short for robot) or agent is a program that performs a repetitive, time consuming task, such as searching Web sites and newsgroups for information and indexing the Web sites and newsgroup listings in a databases or an automatic record-keeping system. For example, a user may utilize a Web site offering a shop bot to search the web for the lowest price for a particular music compact disc (CD). The bot would return a listing of web sites selling the particular CD and the price offered by each site. A user is relieved of the task of going to each web site, searching for the CD and recording the price of the CD at that site. However, while bots provide for gathering consumer provider information in a time-efficient manner, typically bots do not provide for the web retailers to respond with additional specialized products and services according to customer preferences. In addition, in the example of the CD, if a user selects to purchase the CD from a particular site provided by the bot, the user must still enter preferences and personal information to register at the site to make the purchase.

Global positioning systems (GPS) add to the applications of personal, portable computer systems. In the consumer world, as personal computer systems include GPS and communication mediums to connect to a network, personal computer systems may receive regionalized advertising and sale updates. For example, a shopper's eye system, incorporating a personal digital assistant (PDA) equipped with a GPS and wireless Internet Protocol (IP), enables a two-way channel with a central control center through which retailers can present customized offers to nearby shoppers based on their particular interests. In particular, the location of a user, shopping goals, preferences and related history may be detected by a central control center for a mall the user has entered. This information is routed to stores in the mall and as the stores receive this information, they may create a customized offer of bundled goods and services. In addition, manufacturers of competing goods are notified and may respond with incentives to add to the offer. The offer is transmitted from the central control center to the user's PDA.

However, the shopper's eye system only provides for a user to receive electronic information at their PDA within a controlled network environment, such as a mall. In addition, the shopper's eye system does not provide for a user to selectively broadcast their preferences to particular stores within a mall or any other shopping environment. In addition, the shopper's eye system does not provide for adjusting both offers transmitted to a user's PDA and the service received by the user upon entering a store. Moreover, the shopper's eye system does not including filtering data at the PDA, such as the shopping preferences for the user, according to the retailer, in order to limit the type of data provided to a particular store or stores. Furthermore, the shopper's eye system does not provide for filtering offers received at the user's PDA to only certain types of offers and to protect against retailer spamming. In addition, the shopper's eye system does not provide for changing electronic advertising at the store or at an output interface accessible to the user according to the user's shopping preferences and location. Moreover, the shopper's eye system does not provide for linking a user's registration at a web site provided by the retailer with the store location provided by the same retailer.

In view of the foregoing, it would be preferable to provide a portable computer system as a personal preference manager that includes multiple types of preferences for a user that are filterable and exportable to multiple diverse retailers such that the retailers can personalize services and products provided to that user. It would be preferable for the retailer to personalize services provided both electronically and via employees to improve customer service. In addition, it would be preferable for a user to designate security criteria for the multiple types of preferences such that differing levels of preferences are transmitted to retailers according to criteria such as the type of retailer, reputation of a retailer, location of a retailer, etc. Moreover, it would be preferable to adjust advertising provided by retailers at display devices accessible to the user according to user preferences. In addition, it would be preferable to link Internet shopping and location shopping such that a user can automatically register at a web site via a bot or via visiting the physical store location.

SUMMARY OF THE INVENTION

In view of the foregoing, it is therefore an object of the present invention to provide an improved electronic preference manager.

It is another object of the present invention to provide an improved method, system, and program for electronically managing consumer preferences for a user.

It is yet another object of the present invention to provide an improved method, system, and program for utilizing a single portable data processing system to manage transmission of consumer preferences for a user to multiple diverse retailer systems.

In accordance with the method, system, and program of the present invention, consumer preferences designated for a user are transmitted in a transmittable data format from a portable data processing system associated with the user to multiple independent server systems each associated with a consumer provider from among multiple diverse consumer providers, in response to detecting the physical presence of the portable data processing system associated with the user within a particular proximity of multiple venues associated with the diverse consumer providers. Specialized services and products from each of the diverse consumer providers may be designated for the user at each of the independent server systems, in response to comparing the consumer preferences for the user with a database of services and products at each of the independent server systems. The designated specialized services and products are transmitted to the portable data processing system in the transmittable data format, such that a consumer provider from among multiple diverse consumer providers adjusts services and products provided to a particular user via a portable data processing system according to electronically received consumer preferences for the particular user.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

The present invention may be executed in a variety of systems, including a variety of computing systems and electronic devices under a number of different operating systems. In a preferred embodiment of the present invention, the computer system is a portable computing system such as a notebook computer, a palmtop computer, a personal digital assistant, a telephone or other electronic computing system that may also incorporate communications features that provides for telephony, enhanced telephony, messaging and information services. However, the computer system may also be, for example, a desktop computer, a network computer, a midrange computer or a mainframe computer. Preferably, in order to enable at least one of these communications features, the computer system is able to be connected to a network, such as the Internet by either a wired link or wireless link. In addition, the computer system may be a stand-alone system or part of a network such as a local-area network (LAN) or a wide-area network (WAN). Therefore, in general, the present invention is preferably executed in a computer system that performs computing tasks such as manipulating data in storage that is accessible to the computer system. In addition, the computer system includes at least one output device and at least one input device.

Figure 1:
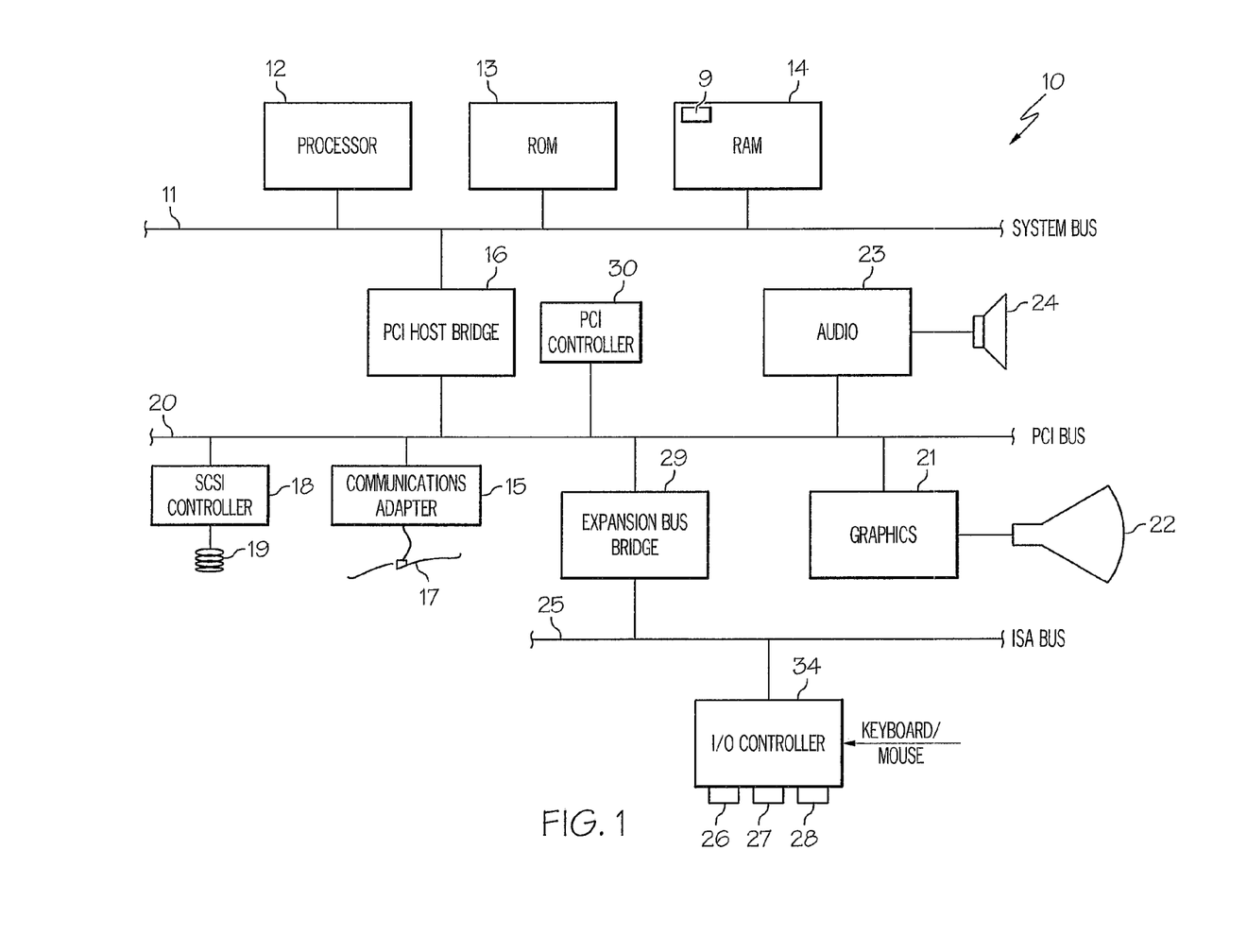
FIG. 1 depicts an one embodiment of a data processing system with which the method, system and program of the present invention may advantageously be utilized.

Referring now to the drawings and in particular to FIG. 1, there is depicted a block diagram of one embodiment of a computer system that may utilize the present invention. As depicted, data processing system 10 includes at least one processor 12, which is coupled to system bus 11. Each processor 12 is a general-purpose processor, such as IBM's PowerPC™ processor that, during normal operation, processes data under the control of operating system and application software stored in random access memory (RAM) 14 and Read Only Memory (ROM) 13. The operating system preferably provides a graphical user interface (GUI) to the user. Application software contains instructions that when executed on processor 12 carry out the operations depicted in the flowcharts of FIGS. 4, 5 and others described herein.

Processors 12 are coupled via system bus 11 and Peripheral Component Interconnect (PCI) host bridge 16 to PCI local bus 20. PCI host bridge 16 provides a low latency path through which processor 12 may directly access PCI devices mapped anywhere within bus memory and/or I/O address spaces. PCI host bridge 16 also provides a high bandwidth path for allowing PCI devices to directly access RAM 14.

PCI local bus 20 interconnects a number of devices for communication under the control of PCI controller 30. These devices include a Small Computer System Interface (SCSI) controller 18, which provides an interface to SCSI hard disk 19, and communications adapter(s) 15, which interface data processing system 10 to at least one data communication network 17 comprising wired and/or wireless network communications. In addition, an audio adapter 23 is attached to PCI local bus 20 for controlling audio output through speaker 24. A graphics adapter 21 is also attached to PCI local bus 20 for controlling visual output through display monitor 22. In alternate embodiments of the present invention, additional peripheral components may be added. For example, in alternate embodiments, a tactile display component may be provided.

PCI local bus 20 is further coupled to an Industry Standard Architecture (ISA) bus 25 by an expansion bus bridge 29. As shown, ISA bus 25 has an attached I/O (Input/Output) controller 34 that interfaces data processing system 10 to peripheral input devices such as a keyboard and mouse (not illustrated) and supports external communication via parallel, serial and universal serial bus (USB) ports 26, 27, and 28, respectively.

Figure 2:
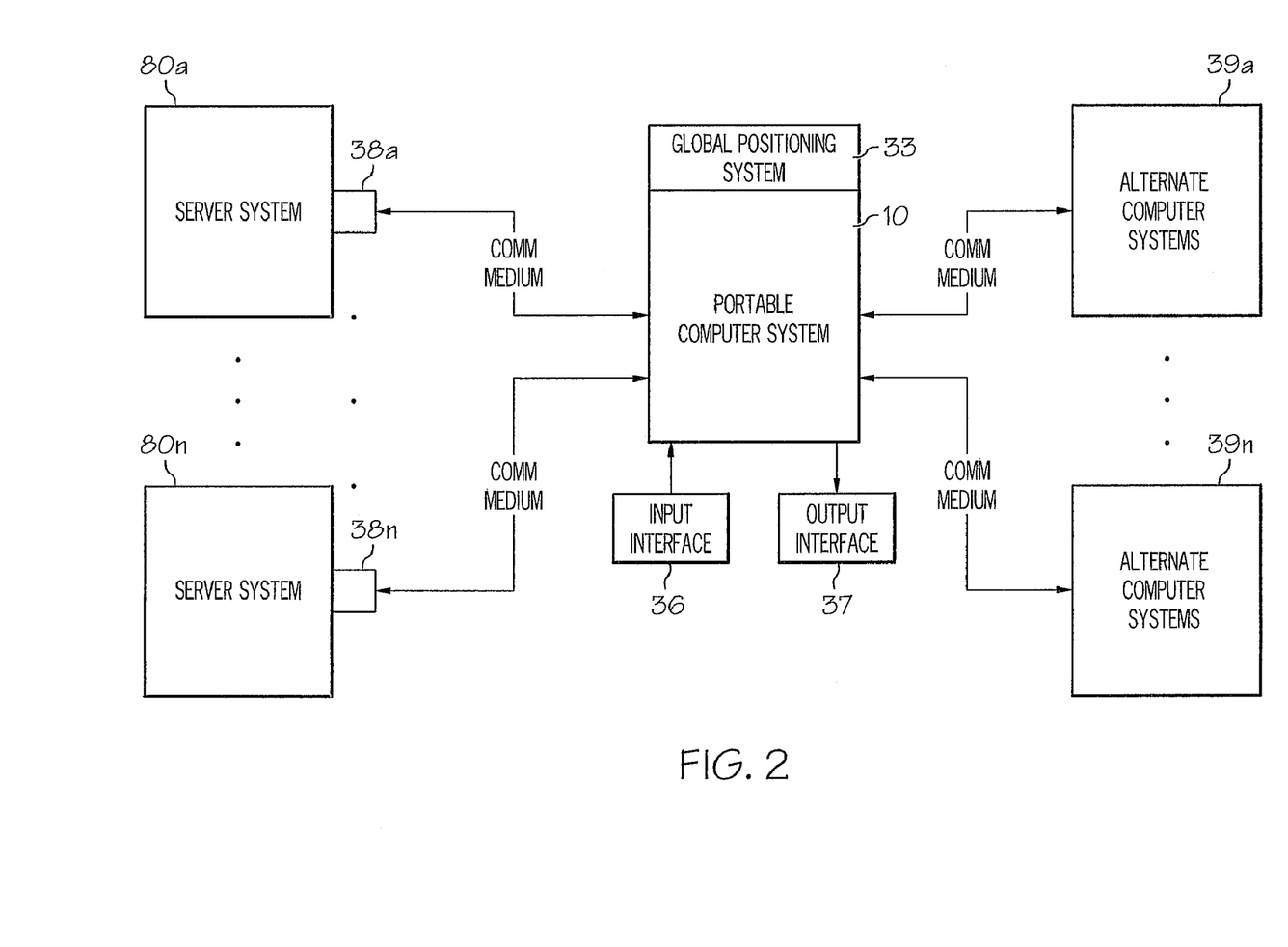
FIG. 2 illustrates a high level block diagram of one embodiment of an electronic consumer preference management system in accordance with the method, system, and program of the present invention.

With reference now to FIG. 2, there is illustrated a high level block diagram of an electronic consumer preference management system in accordance with the method, system, and program of the present invention. As depicted, portable computer system 10 communicates with multiple diverse server systems 80a-80n via a bi-directional communications medium (or across a communication interface). In addition, portable computer system 10 communicates with multiple diverse computer systems 39a-39n that include multiple diverse consumer preferences for multiple diverse individuals. The communications medium may include wired or wireless communications or other communications media that enables bi-directional transmission of data. Moreover, the communications medium may include a link to a network, such as the Internet, or a direct data link. Furthermore, data may be transmitted from server systems 80a-80n to an electronic mail address that is accessible to portable computer system 10.

In a wired embodiment of the communications medium, for example, server systems 80a-80n and alternate computer systems 39a-39n are connected to computer system 10 via parallel, serial, or USB ports, or the communication adapter as depicted in FIG. 1. In a wireless embodiment of the communications medium, for example, server systems 80a-80n and alternate computer systems 39a-39n are wirelessly connected to computer system 10 via infrared, radio frequency (RF), cellular and other wireless transmissions which are detected by computer system 10. Wireless transmissions between computer system 10 and server systems 80a-80n and alternate computer systems 39a-39n may occur passively or actively.

Data exchange across the communications medium is advantageously performed in at least one of multiple available data transmission protocols and is preferably supported by a common data structure format, such as the extensible mark-up language (XML) data structure format. Data transmission protocols may include, but are not limited to, Transmission Control Protocol (TCP), Internet Protocol (IP), Hypertext Transfer Protocol (HTTP), and Bluetooth. In addition, data may be transmitted in a secure manner via encryption or by technologies, such as secure socket layer (SSL) or virtual private networks (VPN).

An example of an XML data file that might be transmitted from server systems 80a-80n to portable computer system 10, as depicted below, preferably contains data that is distinguished by attributes on elements and may be wrapped within a larger element. For example, the data attributed to element "<TimeStamp></TimeStamp>" designates the time that the data was attributed to the XML data file.

<PROD/SERV TimeStamp="888965153" MachineID="77" LocationName="RetailerA-SouthAustin" UserID=>"JANEXYZ" UserAddress="163.342.5.6" SpecOffer="Red Jacket for $20 off" SpecOfferGraph="jacket.jpg" Clothing="Red Jacket" ClothCost="40.00" ClothSize="M" Footwear="Black Shoes" FootwearCost="30.00" FootwearSize="9" Service="Shoe Shine" ServiceCost="5.00/shoe">

A second example of the same data in an alternate XML data format this includes elements and attributes is illustrated below <TimeStamp>888965153</TimeStamp>
<MachineID>77</MachineID>
<LocationName>RetailerA-SouthAustin</LocationName>
<UserID>JANEXYZ</UserID>
<UserAddress>163.342.5.6</UserAddress>
<SpecOffer>Red Jacket for $20 off</SpecOffer>
<SpecOfferGraph>jacket.jpg</SpecOfferGraph>
<Clothing>Red Jacket</Clothing>
<ClothCost>40.00</ClothCost>
<ClothSize>M</ClothSize>
<Footwear>Black Shoes</Footwear>
<FootwearCost>30.00</FootwearCost>
<FootwearSize>9</FootwearSize>
<Service>Shoe Shine</Service>
<ServiceCost>5.00/shoe</ServiceCost>

In the examples, as will be further described, consumer preferences for a particular user are preferably transmitted from computer system 10 to multiple diverse retailer server systems 80a-80n. The multiple diverse retailer server systems 80a-80n may compare the user's consumer preferences with products and/or services offered by the retailer and transmit a specialized offering of products and/or services to the user. The above described XML data file examples are intended as functional examples of XML data files of a specialized offering for a particular user that might be transmitted to the user's computer system 10 from a particular retailer server system. The elements, format of the elements and data included with the elements is provided to depict an example and is not intended to limit the types of elements, format of elements or data included with elements that are in an XML data file.

In particular, in the examples, a specialized product and service offering is designated for a user "JANEXYZ" by Retailer A's SouthAustin store from a server system with a machine ID of "77". The specialized product and service offering includes a special offer of $20 off a red jacket and includes a graphical image of the red jacket. In addition, the specialized offering includes a clothing product of a red jacket for $40.00 in a medium size. Advantageously, the size of the red jacket determined by the retailer in the product offer is the size that would most likely fit the user in view of the user's profile. In addition, the red jacket is advantageously within a particular price range, color, and/or style of jacket preferred by the user as indicated in the user's consumer preferences retrieved from computer system 10 or by a request from the user retrieved from computer system 10. Moreover, the footwear offering of size 9 black shoes for $30.00 is preferably the size needed by the user and the black shoes are preferably within a particular price range, color and/or style preferred by the user as indicated in the user's consumer preferences retrieved from computer system 10.

In addition, in the examples, a service offering of a shoe shine is provided for $5.00 per shoe. The offering of the shoe shine is preferably in response to a user request for a shoe shine service or an indicator in the user's consumer preferences that a shoe shine service is preferred as retrieved from computer system 10.

In the example of the XML data format as the common transmittable data format, a data validation file such as a document type definition (DTD) or schema is preferably utilized to validate XML data files. In addition, a schema preferably translates multiple XML data files. Moreover, a style sheet such as an extensible stylesheet language (XSL) file is preferably utilized to provide a style specification for the XML data at the receiving system. In particular, DTDs, schemas, and XSL files may be, for example, transmitted with an XML data file to a receiving system or downloaded at the receiving system from an alternate source. In the present example, the DTD or schema would verify that all the data required for a specialized product offering is included in the XML data file.

Portable computer system 10 may broadcast data in the common transmittable data format, including consumer preferences and a user profile, to server systems 80a-80 and alternate computer systems 39a-39n via a transceiver or other broadcasting medium. In broadcasting data, server systems 80a-80n and alternate computer systems 39a-39n may determine the location of portable computer system 10 according the data signal received at transmission receivers, such as transmission transceivers 38a-38n.

In particular, according to the communication medium utilized, portable computer system 10 may be within a particular proximity of server systems 80a-80n or may be remotely located to server systems 80a-80n. For example, if the communication medium is a wireless Internet connection, server systems 80a-80n may remotely receive a broadcast from portable computer system 10. Alternatively, if the communication medium is an RF transmission, server systems 80-80n may receive a broadcast from portable computer system 10 when portable computer system 10 is within a particular proximity of transmission transceivers 38a-38n of server systems 80a-80n.

Transmission transceivers 38a-38n may provide multiple ranges of reception of data transmissions from portable computer system 10 and may be locally or remotely accessible to server systems 80a-80n. In addition, transmission transceivers 38a-38n may provide multiple ranges of data transmissions from server systems 80a-80n. In an example, a store in a mall in Texas may include transmission transceivers 38a-38n that detect a data broadcast from portable computer system 10 when in a particular proximity of the store. The transmission transceivers 38a-38n transmit the broadcast data to a remote server system in California. The remote server system determines a product and/or service offering and transmits the product and/or service offering back to transmission transceivers 38a-38n that then transmit the offering to computer system 10.

In addition, portable computer system 10 may selectively transmit data to server systems 80a-80n and alternate computer systems 39a-39n. In selectively transmitting data portable computer system 10 may, for example, direct data transmissions to a particular IP address or addresses, establish a secure connection with selected servers or encrypt broadcasted data utilizing an encryption technique, such as the double blind encryption technique. For example, portable computer system 10 for a user located in Texas may selectively transmit user preferences to a particular store server system via a wireless Internet connection where the server system is located in California.

Moreover, server systems 80a-80n may broadcast data in a common transmittable data format whereby portable computer system 10 passively receives the data and then selects whether to transmit data in return. For example, as a user enters an airport, the airport server system is actively broadcasting data that is detected by computer system 10 within a particular proximity. In another example, as a user is walking through a mall, Internet addresses from various retailers within the mall may be broadcast from the retailers' server systems to portable computer system 10.

Portable computer system 10 may include a global positioning system (GPS) 33 that passively receives the position of portable computer system 10. Thereby, the location of portable computer system 10 as received at global positioning system 33 may be converted into the data transmission data format and transmitted with user preferences, for example, to server systems 80a-80n.

In addition, portable computer system 10 preferably includes at least one input interface 36 and at least one output interface 37. Input interface 36 may include multiple types of input interfaces including, but not limited to, a keyboard, a keypad, a vocal recognition device, a touchpad, a mouse, a tactile-detectable device, etc. Output interface 37 may include multiple types of output interfaces including, but not limited to, a graphical display monitor, a printer, a data storage medium, a audio speaker, etc. In particular, computer system 10 may control multiple output interfaces where different output interfaces have different audiences and purposes, as will be further described.

Server systems 80a-80n advantageously represent diverse independent retailers or consumer providers that are enabled to independently gather data from portable computer system 10. However, server systems 80a-80n may also communicate with each other via a network connection, such as the Internet. Moreover, each of server systems 80a-80n may include multiple servers connected via a network or data link with access to multiple data storage media.

Independent retailers or consumer providers associated with server systems 80a-80n preferably include multiple types of diverse businesses that provide products and services to consumers. Included in the scope of consumer providers are non-profit organizations that may provide products and services for no charge and for profit organizations that provide products and services for a charge. In addition, included in the scope of consumer providers are individuals with expertise in a particular area or areas. For example, an attorney with expertise in intellectual property may be associated with server systems 80a-80n.

Alternate computer systems 39a-39n advantageously include user preferences for multiple alternate users that can be transmitted to portable computer system 10 in a common transmittable data format. In addition, user preferences stored at portable computer system 10 may be transmitted to alternate computer systems 39a-39n in a common transmittable data format. In an example, a user at a meeting of colleagues may broadcast preferences to learn more about a new emerging technology from portable computer system 10. Alternate computer system 39a-39n of other colleagues at the meeting would receive the broadcast preferences, such that a colleague with expertise about the emerging technology may be located.

Figure 3:
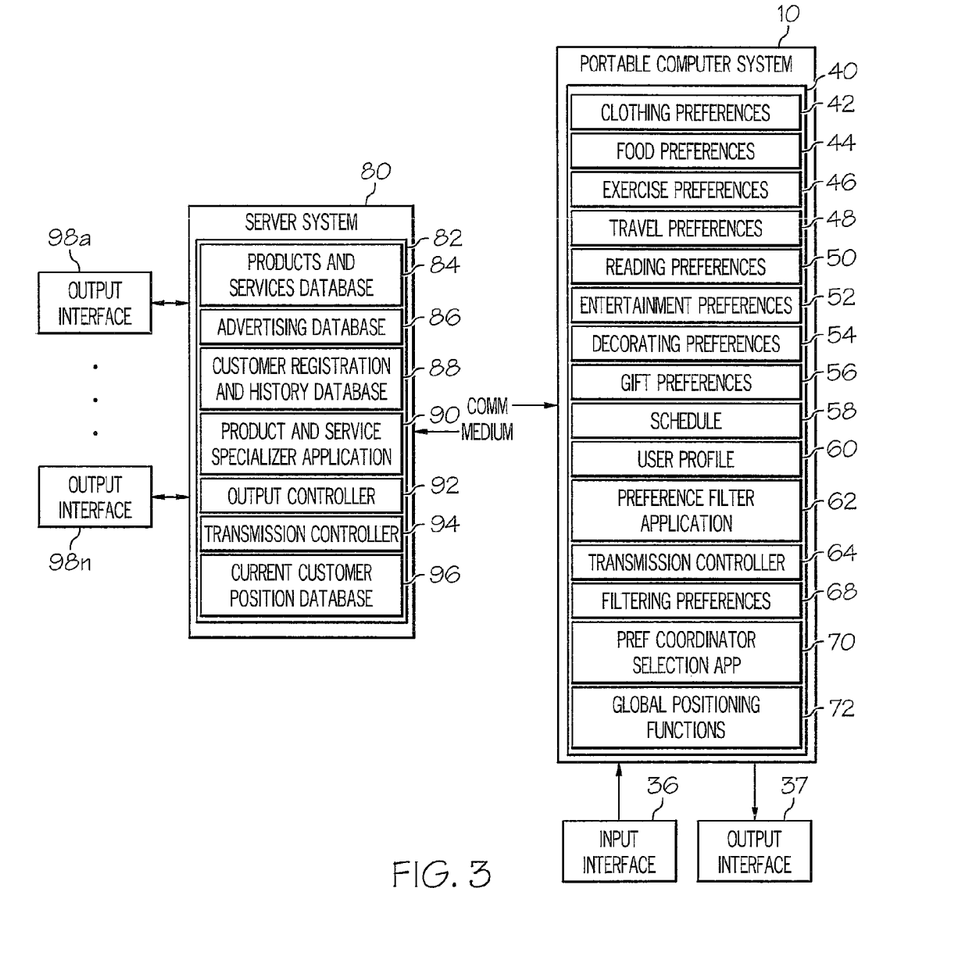
FIG. 3 depicts a detailed block diagram of one embodiment of an electronic consumer preference management system in accordance with the method, system, and program of the present invention.

Referring now to FIG. 3, there is depicted a block diagram of an electronic consumer preference management system in accordance with the method, system, and program of the present invention. Server system 80 preferably supports electronic business for a particular retailer or consumer provider. In the present example, server system 80 includes electronic business related data, services and applications stored in a data storage medium 82 including a products and services database 84, an advertising database 86, a customer registration and purchase history database 88, a product and service specifier application (PSA) 90, an output controller 92, a transmission controller 94, and a current customer database 96. The databases are preferably data storage structures that hold multiple entries and may be searched and/or filtered according to particular criteria. In addition, the data stored in the databases is preferably easily convertable into an XML data file and may be stored as such. In addition, in an alternate embodiment, alternate types of data may be stored in data storage medium 82. Moreover, in an alternate embodiment, additional services and applications may be stored in data storage medium 82.

Server system 80 controls exchange of data to and from multiple portable computer system such as portable computer system 10 via transmission controller 94. In particular, transmission controller 94 establishes a connection via the communication medium with portable computer system 10 whereby the current location of portable computer system 10 and customer preferences and profile stored therein may be transmitted to server system 80. The current customer location may be continuously updated in current customer database 96 if the customer chooses to continuously broadcast. In addition, transmission controller 94 preferably supports data exchange in a common transmission data format, and in particular in the XML data transmission data format.

Server system 80 also controls output of data to multiple diverse output interfaces 98a-98n via output controller 92. Output controller 92 may control transmission of data to multiple diverse output interfaces 98a-98n via a wired or wireless communication medium. The diverse output interfaces may include, but are not limited to, output interfaces within a store for advertising, output interfaces within a store for displaying data to employees only, output interfaces within a shopping arena, and output interfaces along a roadside. Output interfaces 98a-98n may include multiple diverse types of output devices including, but not limited to, flat-screen monitors, LCD graphical displays, electronic paper displays, electronic billboard displays, tactile-detectable displays, audio speakers, printers, and other forms of electronic media output devices.

Products and services database 84 preferable includes multiple diverse products and/or services provided by a retailer or consumer provider. The products and services may include, for example, multiple types of descriptors, prices and conditions. For example, a women's formal dress store may include a database of available dresses, with a description of the maker, dress style and color, pictures of the dress, sizes available and price. In addition, for each available dress, a list of the events for which the dress has already been purchased may be stored. In addition, the database may include service records such as schedules of consultants within the dress store and their availability for a consultation reservation. Moreover, the database may include a listing and pictures of an expected shipment of dresses that are viewable on the condition that a customer has made previous purchases at the store.

Advertising database 86 preferably includes multiple electronic advertisements including graphical rendering, audio and video. For example, the women's formal dress store may include a video commercial of a new line of dresses for petite women. In addition, the formal dress store may include graphical advertising for their consulting services including audio of the consultants describing their services. The electronic advertisements stored in advertising database 86 may be stored according to multiple searchable keywords. In addition, the advertisements stored in advertising database 86 may be stored in a compressed file that is transferable to portable computer system 10.

Customer registration and history database 88 preferably includes registration data for multiple users and any purchase history as a registered customer. Advantageously, customer registration data is received from portable computer system 10 as consumer preferences and profile in an XML data format with a schema that is utilized for validating and translating the XML data file. In particular, the XML data and schema may be transmitted from portable computer system 10 at a store location or via the Internet to a retailer's web site. Server system 80 may fill in an electronic registration form for the user from the user profile XML data file as depicted below.

<TimeStamp>888965153</TimeStamp>
    <UserID>JANEXYZ</UserID>
    <Address>102 Pickwick</Address>
    <City>Austin</City>
    <State>Texas<State>
    <ZipCode>78746</ZipCode>
    <ClothingPref>assistant with dress shopping</ClothingPref>
    <ClothingPref>emerald blue</ClothingPref>

The electronic form is filled in by matching elements from the XML data file depicted above with elements of the electronic registration form. For example, the elements of the electronic registration form at a particular server system may include <UserID>, <ZipCode> and <ClothingPref> where only those data elements are transferred from the XML data file into the electronic registration form. After registration, a registration indicator, such as a cookie, may be transmitted from the server system to portable computer system 10.

The example of an XML data file comprising a user profile and consumer preferences as depicted above is intended as an example of elements that might be included in a user profile and consumer preferences. The customer registration may also include, but is not limited to including, personal data, shopping preferences, current products owned and current services utilized. In addition, for each customer purchase a history of the date, time, place, sales person, price paid, etc. associated with the purchase is preferably recorded in customer registration and history database 88.

Advantageously, via the method, system, and program of the present invention, a user may be registered at a particular server system for a particular retailer and the data is preferably accessible via a network of servers at the web site for the retailer and at any of the store or service locations of the retailer. And, in particular, a user may be automatically registered at multiple diverse retailer server systems without the user being required to re-enter redundant data to each server system. Moreover, it is important to note that the user may be automatically registered at multiple diverse retailer server systems via transmittal of registration data from the user's personal portable computer system as they enter a store location or at an Internet web site location.

PSA 90 preferably analyzes a customer's preferences when the customer is detected locally or remotely. First, PSA 90 may determine an offering of selections of products and services from among products and services database 84 that meet the user's preferences as currently stored in current customer database 96. In addition, the selection of products and services from among products and services database 84 may be further specified according to the user's purchase history. For example, if a customer at the women's formal dress shop typically purchases a necklace with each dress purchase, then necklace and dress pairings may be specified for the user. The selection of specified products and services may include photo, video and audio clippings in addition to descriptions and prices. Transmission controller 94 preferably controls secure transmission of the selection of specified products and services to the user's portable computer system 10.

In one embodiment of the present invention, the offering of products and services may be transmitted to portable computer system 10 in the XML data format including a schema for defining the types of data and an XSL stylesheet for defining how the data should be graphically displayed. Portable computer system 10 preferably includes a graphical output controller that verifies and translates the XML data according to the schema and XSL style sheet. In addition, the specified products and services may include electronic coupons and rebates for use when purchasing the products or services at the venue or on-line. For example, a user may receive an electronic coupon when visiting a retailer's store that can be redeemed at the store or on-line.

In addition to descriptions of products and services, data that is typically included on a business card or company description may be transmitted to portable computer system 10. For example, if a user enters an insurance agency, the server system for the insurance agency preferably receives a user profile from portable computer system 10 and transmits electronic business card XML data files for the office employees to portable computer system 10. Thereby, the user receives an electronic copy of the office employees personal data, such as data typically included on a business card, in an XML data file that can be selectively added to an address book by matching elements of the XML data file with elements of the address book.

A second function of PSA 90 is determining service and product recommendations to a retailer staff. Service and product recommendation to a retailer staff may be determined from the customer's preferences, location, registration, previous purchases, the store's customer service policy and available products and services. For example, if a user enters the store whose customer preference indicate that the user appreciates staff assistance, that the user is shopping for a new bed, and that the user prefers dark woods, a staff person would be provided with a list of possible products from PSA 90 and a profile about the user that will assist the staff person in approaching the customer. In another example, a user's preferences may indicate that the user does not need help from a salesperson, for example when shopping for furniture. PSA 90 might determine that a staff person should greet the customer and only offer assistance if requested. Output controller 92 preferably controls distribution of service and product recommendations to output interface(s) that are accessible only by staff.

Service and product recommendations may be stored by customer and according to the staff person(s) who view the service and product recommendations to determine if the staff person(s) followed through on the recommendations and the response by the customer. In addition, an electronic customer satisfaction form may be transmitted to a user after exiting a store whereby the user may electronically indicate satisfaction with service. By monitoring service and product and recommendations and customer responses, business analysis of a store's productivity due to factors such as the effectiveness of different models of consumer assistance, may be more easily determined.

A third function of PSA 90 is determining which advertising selections from advertising database 86 to display in a store, in an open arena, on the road-side and on-line. Advertising selections are preferably determined by PSA 90 according to customer preferences in current customer database 96 and the type of output interface. Further, advertising selections may be filtered according to the specialized listing of products and services that are determined by PSA 90 and offered to the customer on via the user's portable computer system 10. Moreover, additional criteria, such as current sales, may be utilized to filter advertising selections for advertising database 86. For example, typically there is more than one customer in a store. Therefore, PSA 90 would select advertising selections according to multiple customer preferences. In selecting advertising selections according to multiple customer preferences, criteria such as customer preferences for the majority of customers, customer preferences for frequency shoppers, customer preferences for users who have been in the store for a certain period of time, etc. may be utilized to filter advertising selection.

The advertising selections determined by PSA 90 are preferably output to multiple output interfaces 98*a*-98*n* as controlled by output controller 92. Output controller 92 may control transmission of the advertising selections via a communication medium that includes wired and wireless connections. In an example, a teenage clothing store may include display monitors around a mall that are adjusted according to the detected customer preferences of teenagers near the display monitors. As a teenager enters the store, display monitors at the front of the store may adjust to advertising specific for that teenager's preferences. For example, if that teenager likes to wear all pink and black, current clothing stock in pink and black would be displayed. Other display monitors around the store would display advertising that fits a majority of the customer's preferences in the store. For example, if the majority of shoppers are men, then more male oriented advertising might be displayed. When a teenager enters a fitting room, a display monitor may show a video advertisement and play music that is specific to the teenager's preferences. Moreover, a small display monitor at the cash register might show an advertisement for a small item that is located near the register according to purchases being made by the teenager.

Portable computer system 10 preferably includes multiple preferences recorded in a single database or multiple databases and applications stored in a data storage medium 40. In the present example data storage medium 40 is depicted as internally accessible to portable computer system 10, however in alternate embodiments, data storage medium 40 may be accessible externally or remotely.

In the example depicted, customer preferences include clothing preferences 42, food preferences 44, exercise preferences 46, travel preferences 48, reading preferences 50, entertainment preferences 52, decorating preferences 54, and gift preferences 56. Included in the customer preferences may be a shopping list of items to find, budget preferences, location preferences, content preferences, customer service preferences, etc. For example, clothing preferences 42 may include preferred manufacturers, sizes, colors, clothing types for upcoming events, budget constraints, etc. while reading preferences 50 include a list of books to purchase, preferred types of literature, authors, current readings, etc. In additional examples, food preferences 44 may include preferences such as the type of table that a user likes to sit at (i.e. outdoor/indoor, in a corner/away from a corner, smoking/nonsmoking, etc.) and exercise preferences 46 include preferences for a massage afterwards within a particular travel distance of the gym and the training, length of sessions, and sex of the massage therapist may also be indicated.

While these preferences represent many of the consumer preferences that may be designated by a user at portable computer system 10, the consumer preferences depicted are intended to illustrate possible preferences and do not limit the types of consumer preferences which may be stored on data storage medium 40. Moreover, the preferences may be stored in multiple types of formats and may be compiled and sorted according to multiple criteria. For example, a list of items to find at a particular shopping center may be sorted.

In addition, preferences are preferably storable on portable computer system 10 for other people or clients. Moreover, consumer preferences are preferably transmittable from one portable computer system to another portable computer system. For example, a decorator may include a list of decorating preferences for multiple clients within decorating preferences 54 of the decorator's portable computer system, where the decorating preferences for multiple clients are transmitted from the client's portable computer system to the decorator's portable computer system. In another example, a parent may include a list of children's clothing preferences in clothing preferences 42 of the parent's portable computer system.

In addition, to including preferences on portable computer system 10, the user's schedule 58 and user profile 60 are preferably included. The user's schedule 58 preferably includes an electronic calendar of events, appointments and tasks. User profile 60 preferably includes personal data about the user such as name, sex home data, work data, payment account information, marital status, primary language, children, etc. In addition, user profile 60 may include encrypted registration ID's for various retailers as a result of the user registering with the retailer that can be easily decrypted by the retailer's server system. Moreover, user profile 60 may include cookies from registration with multiple retailers.

Moreover, portable computer system 10 includes global positioning functions 72. Advantageously, portable computer system 10 includes GPS 33 that detects and transmits the position of portable computer system 10 and may passively receive additional information about surroundings including traffic, descriptions of stores and offices, etc. according to location. The position of portable computer system 10 and surrounding are preferably utilized by global positioning functions 72 to provide maps of the current location with directions to stores and offices, routes to avoid traffic, etc.

Portable computer system 10 includes a preference coordinator application 70 that coordinates the consumer preferences, schedule 58, user profile 60, global positioning functions 72 and other data stored on portable computer system 10 with transmission controller 64. For example, a user may select by preference coordinator application 70 to broadcast preferences and location in the transmittable data format via transmission controller 64 to any retailer server system, such as server system 80, that is able to detect the user's physical presence within a particular proximity according to the user's scheduled travel time. In another example, a user may select by preference coordinator application 70 to transmit location and preferences to a particular server system or group of server systems that are able to detect the user's physical presence within a particular proximity. In yet another example, preference coordinator application 70 coordinates transmittal of a request by a user for a restaurant that provides a particular type of wine according to a user's preference. Preference coordinator application 70 broadcasts the preferences to restaurants that are able to detect the user's physical presence within a particular proximity and to restaurants with web pages accessible via the Internet that include wine listings. Thereby, a bot application is simulated where requests for a particular wine are transmitted locally and remotely.

Moreover, preference coordinator application 70 analyzes the consumer preferences, schedule 58, user profile 60 and location to provide the user with recommended shopping venues. In particular, preference coordinator application 70 preferably has access to a map and position via global positioning functions 72 such that the user's current location in comparison with retailers and other offices can be determined. Preference coordinator application 70 processes the selections of products and services received from various retailers in accordance with the location, expected travel time, schedule and other data to provide a recommendation of stores with directions and estimated travel time. For example, if a user's food preferences 44 include a grocery list that includes specialty Asian cooking products and two Asian grocery stores within a particular area transmit a selection of products including the specialty Asian cooking products, preference coordinator application 70 would analyze the prices offered by each grocery store and the travel time in comparison with whether time or money is a larger constraint for the user to recommend one of the two Asian grocery stores.

In addition, portable computer system 10 includes a preference filter application 62 and filtering preferences 68. Preference filter application 62 filters data prior to transmittable from and data received at portable computer system 10 according to filtering preferences 68. Filtering preferences 68 indicate which data should be filtered from transmittal and receipt according to multiple types of criteria. For example, certain types of data to be transmitted to a server system that does not include a secure data transmission may be filtered according to filtering preferences 68. In addition, data to be transmitted to a server system for a particular type of retailer may be filtered according to filtering preferences 68. Moreover, data received at portable computer system 10 from, for example, a grouping of restaurants may be filtered according to preferences set in filtering preferences 68 in order to prevent products and services spamming.

Preferably, portable computer system 10 receives requests from server system 80 to register with a retailer. Preference coordinator application may be set to automatically return a request for registration with user profile 60 and the consumer preferences. Alternatively, a user may select particular filtering preferences 68 to be applied to user profile 60 and the consumer preferences by preference filter application 62 prior to enabling transmission of the data for electronic registration with the retailer. By registering with a retailer, a user can quickly make electronic purchases with the retailer via portable computer system 10 and may be registered to received special electronic product and service offers and other special offerings.

In addition, a user may select to electronically purchase a product or service that is transmitted to portable computer system 10 from retailer server system 80. The user may select to have the product or service delivered to the user or the user may opt to receive the product or service at a store front. For example, a user may select to purchase a birthday gift from a local store via the selection of products and services received at portable computer system 10 for that store. If the user is already registered with the retailer, preference coordinator application 70 would direct transmission controller 64 to transmit a request for the product along with payment authorization. In addition, the request for a product may include a wrapping paper selection. Remote server system 80 would receive the product request with the wrapping paper selection and direct the request to the gift wrapping department. If the user is going to pick up the purchase, an estimated time until ready may be transmitted from server system 80 to portable computer system 10. In this manner, a user remotely order products and services from a store via portable computer system 10.

While the present invention may be applied to any server system 80 in communication with a portable computer system 10, multiple examples are provided in order to further describe the functions of the present invention. In an example of the present invention, a user includes ski preferences on portable computer system 10 that include the brand of skis, length of skis, size of boots, types of slopes, etc. A server system for a ski rental store would retrieve the user's preferences in the transmittable data format and provide the user with a selection of ski rental recommendations according to the user's preferences. In addition, if the user prefers snowboards over skis, the display monitors in the store that are accessible to the user may show advertising focused on snowboarding apparel and accessories provided at the store. Once the user reaches a ski resort, the server system for the ski resort would retrieve the user's ski preferences in the transmittable data format and provide a map of recommended runs and lifts required to get to the runs. In addition, the ski resort server system may retrieve the user's ski instructor preferences that designate preferences for an instructor that can speak Spanish and is male. The ski resort server system would determine ski instructors that match the user's preferences and return a schedule of course to select from that the instructor teaches. In addition, the ski resort server system might retrieve the user's food preferences 44 and recommend restaurants on the slopes that meet the user's food preferences. Moreover, the ski resort server system might retrieve the user's entertainment preferences 52 and provide an advertisement for a band playing that evening at the base that meets the user's entertainment preferences. In addition, a user may purchase an electronic ski lift ticket from the ski resort server system via their portable computer system, where the electronic ticket is stored on the portable computer system and detectable at a ski lift to allow entrance to the lift. In purchasing a ticket, the user preferable registers with the ski resort server system and may provide data from user profile 60 including health insurance, medications and known health problems such that if any injury should occur to the user the ski resort personnel would better assist the user.

In another example, under entertainment preferences, a user may store seating preferences and budget preferences for entertainment. Rather than standing in line to purchase a ticket for a performance, a user accesses a web site where the tickets may be purchased. The user's seating preferences and/or budget preferences and number of tickets needed are transmitted from portable computer system 10 to the server system for the web site where a selection of available seats is determined and transmitted back to portable computer system 10. The user may then select seating and automatically transmit filtered user profile data 60, including form of payment, to the server system. The server system would record the purchase of the tickets and preferably transmit an electronic ticket to portable computer system 10. Upon arriving at a theater, the theater server system would detect and verify the electronic ticket from portable computer system 10 and transmit a map of the theater seating with directions to the user's seating back to portable computer system 10. In addition, the user may indicate in user profile data 60 that assistance is needed by the user when being seated in a theater. When the theater server system detects the user, the theater server system would recommend that an usher be provided to the user.

In yet another example, a user includes display preferences on their portable computer system 10. The display preferences might include preferences such as viewing textual data in a large font or in color blind accessible colorings. In an example, a user may transmit their ATM number, transaction amount and display preferences to an ATM machine via portable computer system 10. The ATM machine would adjust the textual display according the user's preferences and perform the requested functions.

In yet another example of the present invention, a restaurant may include a server system that detects user food preferences from a portable computer system including smoking preferences, drink preferences, appetizer preferences, entree preferences, dessert preferences, seating preferences, decorative preferences, etc. In addition, the restaurant server system includes a reservation list and estimated waiting times.

Upon receiving a user's food preferences, the restaurant server system may determine and transmit to the user's portable computer system the next available reservation slot or the wait for seating according to the user's smoking preferences and seating preferences. In addition, the restaurant food server may determine and transmit a selection of food menu items, including a featured wine, that meet the drink and entree preferences. The user may select to be placed on the reservation or waiting list and may designate that the featured wine should be served at the user's table when seated. Thereby, the restaurant server system would prompt a host or waiter to server the featured wine when seating the user.

It is important to note that the level of analysis, functions and services provided by server system 80 is determined by the retailer and therefore retailer server systems and output interfaces may be updated without updating portable computer system 10. For example, a server system may upgrade detectors to increase the range of detection of signals from portable computer systems. In addition, it is important to note that portable computer system 10 is customizable and upgradable according to user preferences. For example, a user may select a smaller portable computer system 10 with a text-only display or with a graphics capable display.

Figure 4:
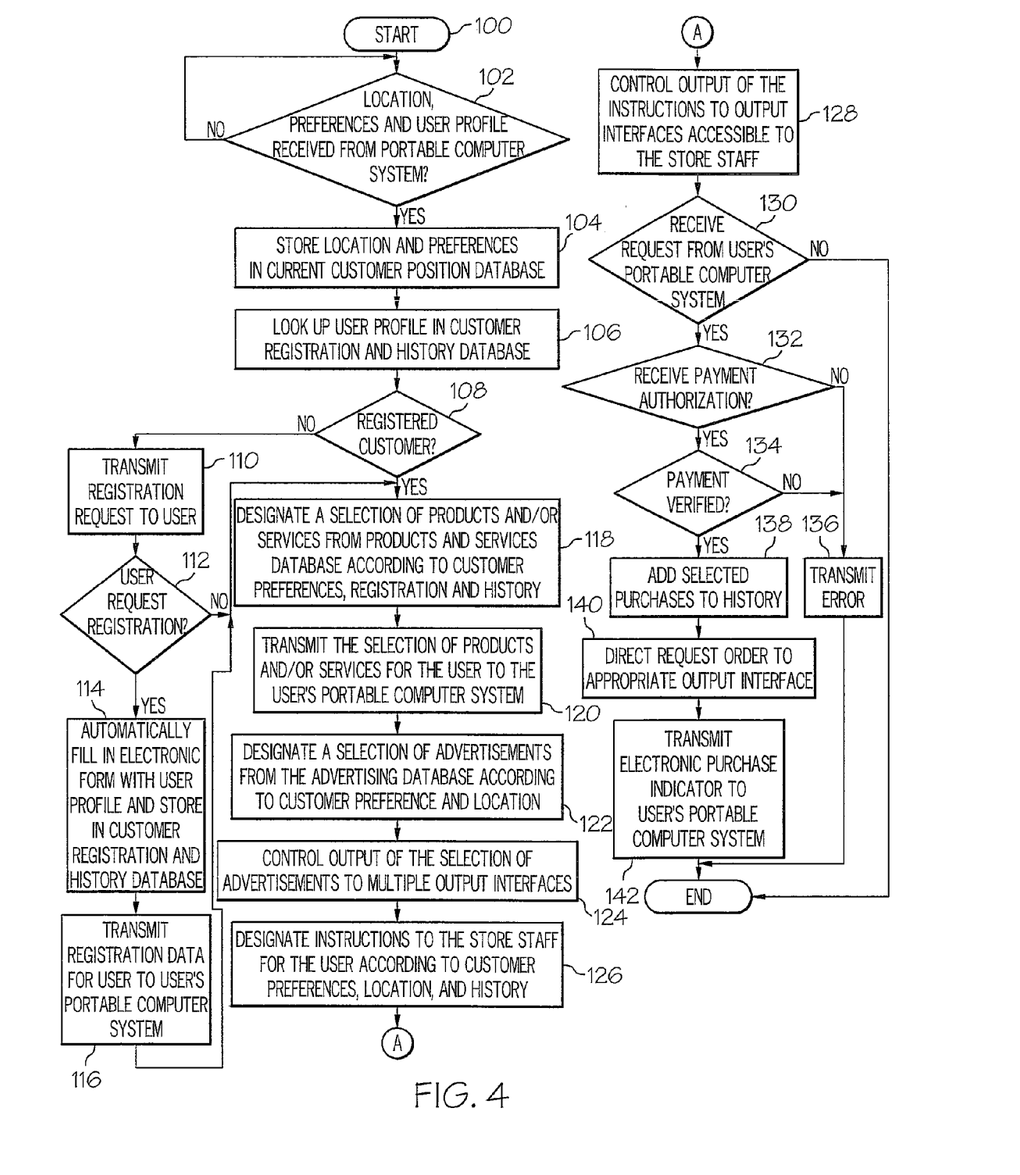
FIG. 4 illustrates a high level logic flowchart of a process and program for controlling a retailer server system in accordance with the method, system, and program of the present invention.

With reference now to FIG. 4, there is depicted a high level logic flowchart of a process and program for controlling a retailer server system in accordance with the method, system, and program of the present invention. As illustrated, the process starts at block 100 and thereafter proceeds to block 102. Block 102 depicts a determination as to whether or not the location, preferences and/or user profile are received from a portable computer system for a user. If the location, preferences and/or user profile are not received, then the process iterates at block 102. If the location, preferences and/or user profile is received, then the process passes to block 104. Block 104 illustrates storing the location and preferences in the current customer position database. Next, block 106 depicts looking up the user profile in the customer registration and history database. Thereafter, block 108 illustrates a determination as to whether or not the customer is registered. If the customer is registered, then the process passes to block 118. If the customer is not registered, then the process passes to block 110.

Block 110 depicts transmitting a registration request to the user. Next, block 112 illustrates a determination as to whether or not the user responds with a request for registration. If the user does not respond with a request for registration, then the process passes to block 118, unless the user must be a registered user in order to obtain data from the server system and then the process would end. If the user responds with a request for registration, then the process passes to block 114. Block 114 depicts automatically filling in an electronic form with the data from the user profile and storing the electronic form in the customer registration and history database. Next, block 116 illustrates transmitting registration data for the user to the user's portable computer system and the process passes to block 118. In particular, an encrypted login name and password may be transmitted as registration data, or alternatively a number or other identifier that represents the user.

Block 118 depicts designating a selection of products and/or services from the products and services database according to customer preferences and any registration and history data. Next, block 120 illustrates transmitting the selection of products and/or services for the user to the user's portable computer system. Thereafter, block 122 depicts designating a selection of advertisements from the advertising database according to customer preferences and location. Next, block 124 illustrates controlling output of the selection of advertisements to multiple output interfaces. Block 126 depicts designating instructions to the store staff according to customer preferences, location and history. Thereafter, block 128 illustrates controlling output of the instructions to output interfaces accessible to the store staff and the process passes to block 130.

Block 130 depicts a determination as to whether or not a request for a selection of offered products and services is received from the user. If a request for a selection of offered products and services is not received, then the process ends. If a request for a selection of offered products and services is received, then the process passes to block 132. Block 132 illustrates a determination as to whether or not payment authorization is received if needed. If payment authorization is not received, then the process passes to block 136. Block 136 depicts transmitting an error message and the process ends. If payment authorization is received, then the process passes to block 134. Block 134 illustrates a determination as to whether or not the payment is verified. If the payment is not verified, then the process passes to block 136. If the payment is verified, then the process passes to block 138. Block 138 depicts adding the selected purchases to the user's history. Next, block 140 illustrates directing the requested order to the appropriate output interface. For example, if the requested order needs to be assembled, then the requested order is output to an output interface accessible to workers who perform assembly. Thereafter, block 142 depicts transmitting an electronic purchase indicator to the user's portable computer system and the process ends.

Figure 5:
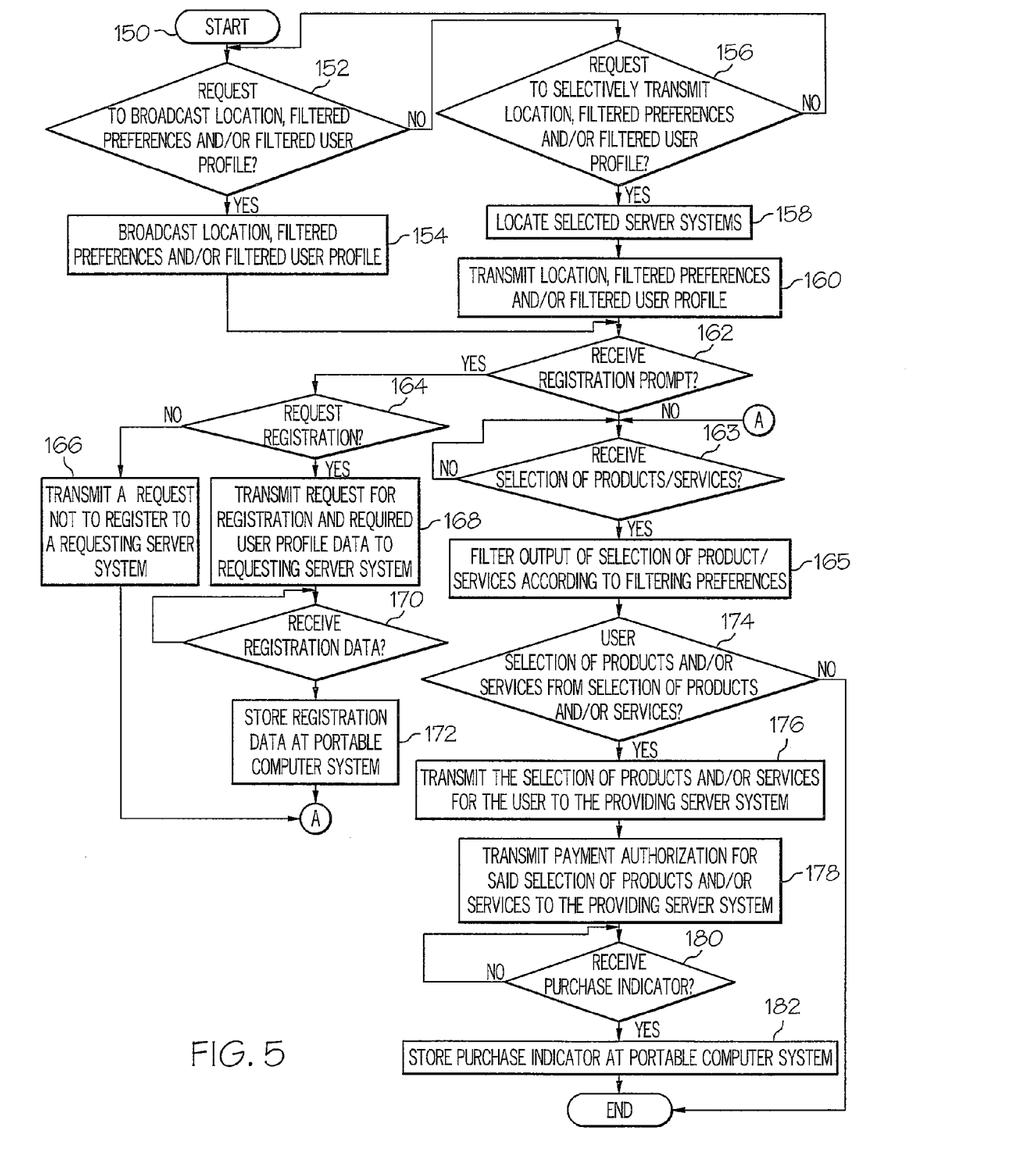
FIG. 5 depicts a high level logic flowchart of a process and program for controlling a portable computer system in accordance with the method, system, and program of the present invention.

Referring now to FIG. 5, there is illustrated a high level logic flowchart of a process and program for controlling a portable computer system in accordance with the method, system, and program of the present invention. As depicted, the process starts at block 150 and thereafter proceeds to block 152. Block 152 illustrates a determination as to whether or not a request to broadcast the location, filtered preferences, and/or filtered user profile data is received. If a request to broadcast is received, then the process passes to block 154. Block 154 depicts broadcasting the location, filtered preferences, and/or filtered user profile data to all server systems able to detect the broadcast signal within a particular proximity and the process passes to block 162. If a request to broadcast is not received, then the process passes to block 156. Block 156 illustrates a determination as to whether or not a request to selectively transmit location, filtered preferences, and filtered user profile data is received. If a request to selectively transmit is not received, then the process passes to block 152. If a request to selectively transmit is received, then the process passes to block 158. Block 158 depicts locating a selected server system. Next, block 160 illustrates transmitting the location, filtered preferences, and/or filtered user profile data to the selected server system and the process passes to block 162.

Block 162 illustrates a determination as to whether or not a registration prompt is received. If a registration prompt is not received, then the process passes to block 163. If a registration prompt is received, then the process passes to block 164. Block 164 depicts a determination as to whether or not a request to register is received from the user. If a request to register is not received, then the process passes to block 166. Block 166 illustrates transmitting a request to not register to a requesting server system and the process passes to block 163. If a request to register is received, then the process passes to block 168. Block 168 depicts transmitting a request for registration and required user profile data to the requesting server system. Next, block 170 illustrates a determination as to whether or not registration data is received from the requesting server system. If registration data is not received, then the process iterates at block 170 for a set time period. If registration data is received, then the process passes to block 172. Block 172 depicts storing the registration data at the portable computer system and the process passes to block 163.

Block 163 depicts a determination as to whether or not a selection of products and/or services is received. If a selection is not received, the process iterates at block 163. If a selection is received, then the process passes to block 165. Block 165 illustrates filtering output of the selection of products and/or services according to the user's filtering preferences. Next, block 174 depicts a determination as to whether or not a user selection of products and/or services from the selection of products and/or services provided by a particular server system is received. If a user selection of products and/or services is not received, then the process ends. If a user selection of products and/or services is received, then the process passes to block 176. Block 176 illustrates transmitting the selection of products and/or services to the providing server system. Next, block 178 depicts transmitting payment authorization for the user selection of products and/or services to the providing server system. Thereafter, block 180 illustrates a determination as to whether or not a purchase indicator is received. If a purchase indicator is not received, then the process iterates at block 180. If a purchase indicator is received, then the process passes to block 182. Block 182 depicts storing the purchase indicator at the portable computer system and the process ends.

Figure 6:
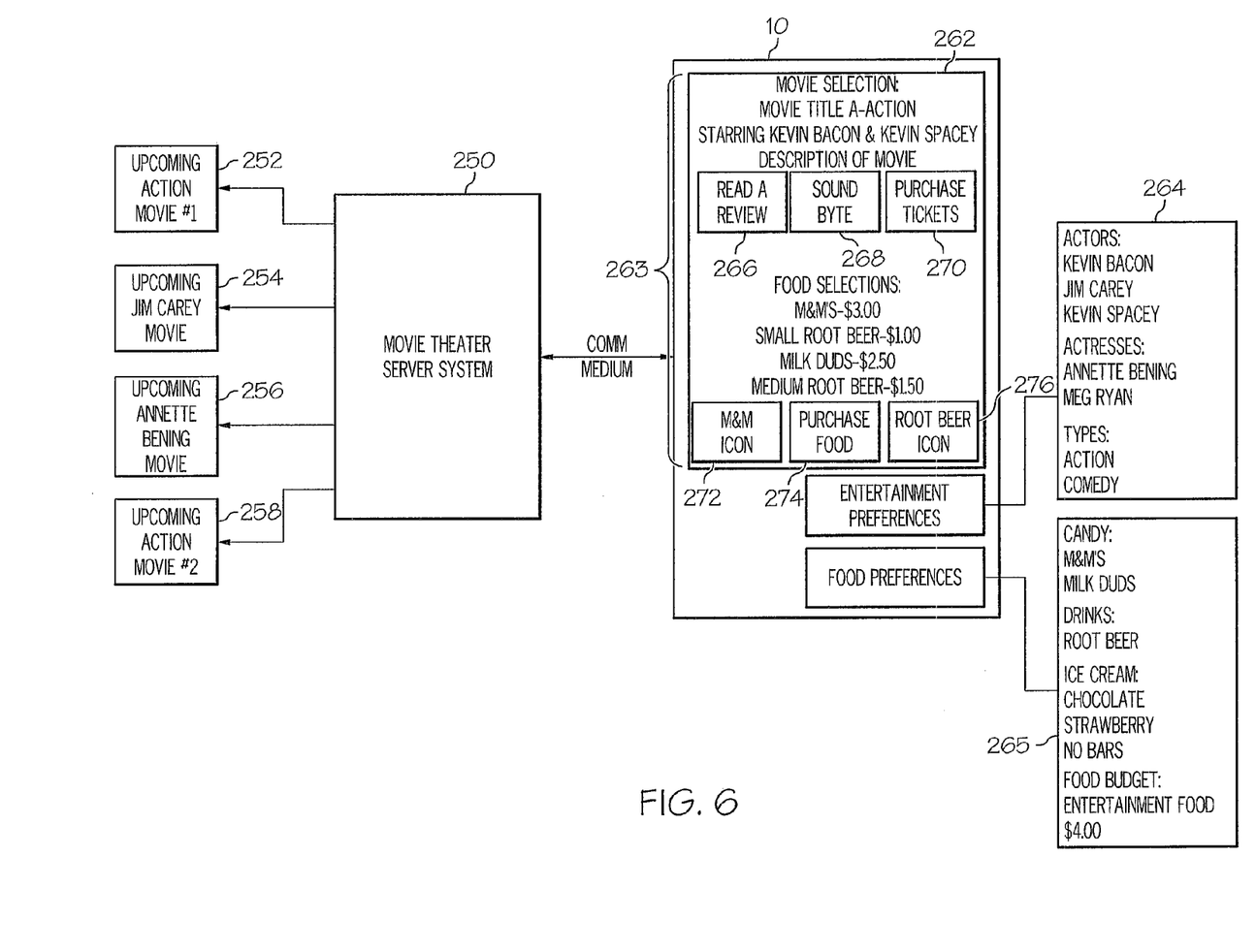
FIG. 6 illustrates a pictorial diagram of multiple output interfaces controlled via a retailer server system in accordance with the method, system, and program of the present invention.

With reference now to FIG. 6, there is depicted a pictorial diagram of multiple output interfaces controlled via a retailer server system in accordance with the method, system, and program of the present invention. As depicted, a movie theater server 250 includes a products and services database that includes multiple movie selections that are preferably sortable by actor, actress, type, rating, review, sound byte, etc and multiple food selections that are preferably sortable by type and cost. Portable computer system 10 includes entertainment preferences for movies as illustrated at reference numeral 264. In the example, the user prefers the actors Jim Carrey, Kevin Bacon, and Kevin Spacey the actresses Annette Bening and Meg Ryan and movies that are classified as comedy and action. Preferably, the user's entertainment preferences are transmitted to movie theater server system 250 where movie theater server system 250 compares the user's entertainment preferences with the multiple movie selection and determines a selection of recommended movies. The selection of recommended movies is preferably transmitted to portable computer system 10 in a transmittable data format. The selection of recommended movies is displayed in a built-in display monitor 262. As depicted at reference numeral 263, one movie is recommended to the user. "Movie title A" includes two of the user's preferred actors and is an action film. The user may select to read a review, as indicated at reference numeral 266, hear a sound byte as indicated at reference numeral 268 or purchase tickets electronically as indicated at reference numeral 270.

In addition, portable computer system 10 includes food preferences for entertainment food as depicted at reference numeral 265. In the example, the user prefers candies including M&Ms® and Milk Duds®, root beer drink, and ice cream including chocolate and strawberries, but not ice cream bars. In addition, a food budget for entertainment food of $4.00 is designated. Preferably, the user's food preferences are transmitted to movie theater server system 250 where movie theater server system 250 compares the user's food preferences with the multiple food selections and determines a selection of recommended food treats. The selection of recommended food treats is preferably transmitted to portable computer system 10 is a transmittable data format. In addition, icons and other graphical representations may be included in the data formatting for display. The selection of recommended food treats is displayed in built-in display monitor 262 as illustrated at reference numeral 263. In the example, a user may select from M&Ms® and a small root beer or Milk Duds® and a medium root beer. In addition, an M&Ms® icon is depicted as indicated at reference numeral 272 and a root beer icon is illustrated as indicated at reference numeral 276. Moreover, a user may select to electronically place an order by selecting graphical icon 274.

Prior to the movie start, multiple large display screens 252, 254, 256, 258 and 260 along a corridor with the movie theater may display advertising for current and upcoming movie releases or advertising for food treats. In the present example, movie theater server system 250 preferably coordinates the advertising displayed on display screens 252 and 258 according to the movie type of a movie that will begin showing in the next ten minutes. If an action movie will be shown in the next ten minutes in a theater adjacent to the corridor with display screens 252 and 258, then advertising for upcoming action movies is preferable displayed as indicated in the example. Movie theater server system 250 preferably coordinates the advertising displayed on display screens 254 and 256 with movies containing the actors and actresses preferred by users within the corridor. When the user with entertainment preferences 264 is detected in the corridor of the movie theater, display screens 254 and 256 are preferably controlled by movie server system 250 to display advertisements for upcoming movies with Jim Carey and Annette Bening, for example. Moreover, movie theater server system 250 preferably coordinates the advertising displayed on display screen 260 with the food preferences of users within the corridor. When the user with user food preferences 265 is detected in the corridor of the movie theater, display screen 260 is preferably controlled by movie server system 250 to display an advertisement, for example, of a new ice cream treat for $5.00.

It is important to note that, although the present invention has been described in the context of a fully functional computer system, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal-bearing media include, but are not limited to, recordable-type media such as floppy disks or CD-ROMs and transmission-type media such as analogue or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for automatically electronically registering a user, said method comprising:
    generating a request to transmit a plurality of profile elements to a selected server system from among a plurality of server systems;
    transmitting said request to a portable computer system in response to a determination that said portable computer system is within a particular proximity to said plurality of server systems;
    receiving a user profile comprising said plurality of profile elements in a particular transmittable data format at said selected server system from said portable computer system, wherein
        said selected server system is identified at said portable computer system utilizing data within said plurality of profile elements specifying a consumer preference in response to a receipt of said request at said portable computer system,
        said user profile is associated with a particular user of said portable computer system, and
        each of said plurality of server systems is respectively associated with one of a plurality of consumer providers; and
    registering said particular user with a consumer provider of said plurality of consumer providers in response to a receipt of said user profile at said selected server system, wherein said consumer provider is associated with said selected server system.

2. The method for automatically electronically registering a user according to claim 1, wherein said registering comprises:
    inserting each of said plurality of profile elements respectively into a specified plurality of electronic registration elements required for electronic registration at said selected server system; and
    transmitting a registration indicator for said particular user from said selected server system to said portable computer system in said particular transmittable data format.

3. The method for automatically electronically registering a user according to claim 2, said method further comprising:
    in response to a receipt of said registration indicator at said selected server system, retrieving an electronic registration for said particular user.

4. The method for automatically electronically registering a user according to claim 1, said method further comprising:
    automatically filtering a plurality of products and services offered by said consumer provider according to said user profile for said particular user; and
    transmitting a specified offering from among said plurality of products and services to said portable computer system for said particular user.

5. The method for automatically electronically registering a user according to claim 1, wherein said particular transmittable data format comprises an extensible mark-up language data format.

6. A data processing system for automatically electronically registering a user, said data processing system comprising:
    a processor; and
    data storage coupled to the processor, wherein the data storage includes program code that, when executed by the processor, causes the data processing system to:
    generate a request to transmit a plurality of profile elements to a selected server system from among a plurality of server systems;
    transmit said request to a portable computer system in response to a determination that said portable computer system is within a particular proximity to said plurality of server systems;
    receive a user profile comprising said plurality of profile elements in a particular transmittable data format at said selected server system from said portable computer system, wherein
        said selected server system is identified at said portable computer system utilizing data within said plurality of profile elements specifying a consumer preference in response to a receipt of said request at said portable computer system, said user profile is associated with a particular user of said portable computer system, and each of said plurality of server systems is respectively associated with one of a plurality of consumer providers; and register said particular user with a consumer provider of said plurality of consumer providers in response to a receipt of said user profile at said selected server system, wherein said consumer provider is associated with said selected server system.

7. The data processing system for automatically electronically registering a user according to claim 6, wherein said program code causes the data processing system to register the particular user by:

inserting each of said plurality of profile elements respectively into a specified plurality of electronic registration elements required for electronic registration at said selected server system; and transmitting a registration indicator for said particular user from said selected server system to said portable computer system in said particular transmittable data format.

8. The data processing system for automatically electronically registering a user according to claim 7, wherein said program code further causes the data processing system to:

retrieve an electronic registration for said particular user, in response to a receipt of said registration indicator at said particular server system.

9. The data processing system for automatically electronically registering a user according to claim 6, wherein said program code further causes the data processing system to:

automatically filter a plurality of products and services offered by said consumer provider according to said user profile for said particular user; and transmit a specified offering from among said plurality of products and services to said portable computer system for said particular user.

10. The data processing system for automatically electronically registering a user according to claim 6, wherein said particular transmittable data format comprises an extensible mark-up language data format.

11. A computer program product for automatically electronically registering a user, the computer program product comprising:

a computer-readable storage medium; and program code stored within the computer-readable storage medium and executable by a computer to cause the computer to:

generate a request to transmit a plurality of profile elements to a selected server system from among a plurality of server systems;

transmit said request to a portable computer system in response to a determination that said portable computer system is within a particular proximity to said plurality of server systems;

receive a user profile comprising said plurality of profile elements in a particular transmittable data format at said selected server system from said portable computer system, wherein said selected server system is identified at said portable computer system utilizing data within said plurality of profile elements specifying a consumer preference in response to a receipt of said request at said portable computer system, said user profile is associated with a particular user of said portable computer system, and each of said plurality of server systems is respectively associated with one of a plurality of consumer providers; and register said particular user with a consumer provider of said plurality of consumer providers in response to a receipt of said user profile at said selected server system, wherein said consumer provider is associated with said selected server system.

12. The computer program product according to claim 11, wherein said program code causes the computer to:

insert each of said plurality of profile elements respectively into a specified plurality of electronic registration elements required for electronic registration at said selected server system; and transmit a registration indicator for said particular user from said selected server system to said portable computer system in said particular transmittable data format.

13. The computer program product according to claim 12, wherein said program code causes the computer to retrieve an electronic registration for said particular user, in response to a receipt of said registration indicator at said particular server system.

* * * * *